US006209130B1

(12) United States Patent
Rector, Jr. et al.

(10) Patent No.: US 6,209,130 B1
(45) Date of Patent: Mar. 27, 2001

(54) SYSTEM FOR COLLECTING TELEVISION PROGRAM DATA

(75) Inventors: Earl M. Rector, Jr., Tulsa, OK (US); William Hein, Glenmore, PA (US); Connie S. Keck, Tulsa; Indraneel Paul, Bixby, both of OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 08/948,760

(22) Filed: Oct. 10, 1997

(51) Int. Cl.⁷ .................................................. H04N 5/445
(52) U.S. Cl. .............................................. 725/50; 725/54
(58) Field of Search ................................... 348/563, 569, 348/906, 12, 13, 7, 6, 10; 345/327, 328

(56) References Cited

U.S. PATENT DOCUMENTS

| 5,283,639 | * | 2/1994 | Esch et al. ........................... 348/906 |
| 5,499,046 | * | 3/1996 | Schiller et al. ......................... 348/6 |
| 5,559,548 | * | 9/1996 | Davis et al. ............................ 348/6 |
| 5,576,755 |   | 11/1996 | Davis et al. ........................... 348/13 |
| 5,666,645 |   | 9/1997 | Thomas et al. ....................... 455/6.1 |

OTHER PUBLICATIONS

"The Fully Integrated Multichannel Broadcast System: Harder Than It Looks," P.J. Lude, International Broadcasting Convention, Sep. 12–16, 1997, Conference Publication No. 447, IEE (1997).

"Prototyping NBC's GEnesis Broadcast Automation System Using Tcl/Tk," B.D. Sarachan et al., Proceedings of the TCL/TK Workshop, Jul. 6–8, 1995, pp. 251–260.

* cited by examiner

Primary Examiner—Victor R. Kostak
(74) Attorney, Agent, or Firm—Fish & Neave; Alexander Shvarts (57) ABSTRACT

A system for collecting program data from television systems is provided. The program data is collected at a main facility that distributes the program data to television distribution facilities for use in passive or interactive electronic television program guides. The system allows personnel at television station office computers to access a database of program data maintained at the main facility and to construct program schedules electronically using this database. The system error checks the program schedules in real time as they are constructed. The system allows reports, such as ad trafficking reports for use by television station personnel, to be generated based on the program schedule of a given television system.

94 Claims, 6 Drawing Sheets

DATE: AUGUST 8, 1997        CHANNEL: XYZ

| TIME PERIOD | AD MINUTES | PROGRAM TITLE | SUMMARY |
|---|---|---|---|
| 7:00-7:30PM | 10 | PROGRAM 1 | COMEDY... |
| 7:30-8:00PM | 11.5 | PROGRAM 2 | SPORTS... |
| 8:00-8:30PM | 12.0 | PROGRAM 2 | .... |
| 8:30-9:00PM | 11.0 | PROGRAM 3 | TV MOVIE... |

SYSTEM FOR COLLECTING TELEVISION PROGRAM DATA

BACKGROUND OF THE INVENTION

This invention relates to collecting television program data from television systems.

Cable, satellite, and broadcast television systems provide viewers with a large number of television channels. Users have traditionally consulted printed television program schedules to determine the programs being broadcast at a particular time. More recently, various passive and interactive television program guides have been developed that allow television program information to be displayed on a user's television.

For example, a passive program guide may be provided in the form of a continuously scrolling list of television program listings. Such a guide is typically provided on a dedicated television channel. A user can consult the scrolling listings by tuning to that channel.

Interactive program guides allow a user to navigate through television program listings using a remote control. Television listings are typically organized in a grid in which each row contains television program listings for a different channel and each column corresponds to a different scheduled broadcast time. The user can scroll up or down to view program listings for different channels or may pan left or right to view information about programs being broadcast at different times. Various navigational aids may be provided to help the user find program listings of interest.

The distribution system for a passive guide typically uses character generators located at cable system headends to generate scrolling program listings. Because each cable system has a different television program schedule, the character generators in the headends of each cable system must be provided with customized television program data. Such customized television program data is typically transmitted to each headend via satellite.

Passive scrolling guides for satellite television systems operate similarly. Television program data customized for the channel lineup and program schedule of a satellite service may be distributed on a dedicated satellite channel.

Interactive program guides are typically implemented on the set-top boxes or satellite receivers of individual users. Each set-top box or satellite receiver in a given cable or satellite system must be provided with television program data that is customized for that system. Typically, such program data is transmitted via satellite to each cable system headend or satellite distribution facility. The cable system headends and satellite distribution facilities for each television system retransmit the data to the users of that system using the vertical blanking interval or side band of a television channel.

A provider of television program guide data typically maintains a database of television program data such as program titles, ratings, running times, program summaries, reviews, etc. The data provider also must gather data concerning each television system's particular schedule, including the channel lineup, the programs scheduled for each channel and their scheduled broadcast times, pay-per-view pricing and ordering information, etc. Such data is gathered from a variety of sources, such as local television stations, cable systems, satellite systems, national networks, superstations, premium services, pay-per-view services, etc., each of which may have their own schedule information. The data provider customizes the program data for each television system to which program data is distributed.

The process of collecting television program data from its various sources is labor intensive. Television system personnel typically fill out forms by hand and fax or mail this information to the data provider. As a result, errors may be introduced into the data. For example, there is the possibility that errors will be introduced when forms are filled out improperly or when personnel at the data provider make a mistake in transcribing the information from the forms to the computer system at the data provider. Other errors may result from ambiguities in the data (e.g., when two programs share the same title). Resolving such ambiguities and eliminating other potential errors is burdensome for the data provider.

Moreover, there are personnel at the television system who would like to be able use a reliable electronic version of the schedule information contained in the forms. For example, personnel who sell commercial air time need to know precisely how much time is available for advertizing in various time slots.

It is therefore an object of the present invention to provide an improved system for collecting television program data for use in passive and interactive television program guides.

SUMMARY OF THE INVENTION

This and other objects of the invention are accomplished in accordance with the principles of the present invention by providing a system for collecting schedules of television program data at a main facility. The main facility creates customized sets of program data. The customized sets of program data may be used by various television distribution facilities, such as cable system headends, satellite distribution facilities, and television broadcast facilities and may also be used by video and print distribution facilities. The main facility may distribute the program data to the television distribution facilities via a communications link such as a satellite link for use in passive or interactive electronic television program guides. The main facility may similarly distribute the program data to the video and print distribution facilities (e.g., for use in a printed television program guide). If desired, program data may include system-specific information such as pay-per-view pricing information, telephone numbers for pay-per-view ordering or other services, etc.

The electronic data collection features of the system allow personnel at television station office computers to access a database of program data maintained at the main facility and to construct program schedules electronically using this database. The system performs real-time error checking of the program schedules as they are constructed. For example, if the program schedule is made up of a grid of program titles, the real-time error checking may involve checking the grid for overlaps in adjacent grid cells, duplicate titles in adjacent grid cells, or excessive time gaps between grid cells.

Various editing tools may be used to facilitate program data entry in the schedule grid. For example, a program list may be provided that contains titles of television programs obtained from the database of program data at the main facility. Personnel at a television system office computer may select a desired title from the program list. The selected title may be added to the program schedule grid by clicking on an "add" button on the display screen of the schedule construction editing tool. A corresponding "erase cell" button may be provided for erasing a selected cell of program data from the grid.

Summary information associated with a selected title in the program list may be displayed in the program list for personnel constructing the program schedule to review prior to adding the selected title to the schedule. This prevents potentially erroneous entries from being added to the list when two television programs share the same title but are distinguishable based on their summary information.

The system allows reports, such as ad trafficking reports, to be generated based on the program schedules constructed at the television system office computers. Television system office personnel may use these reports when selling advertizing time, making promotions, or performing other sales and marketing tasks that involve the use of detailed program schedule information. If desired, such ad trafficking reports may contain program summary information obtained directly from the main facility database.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
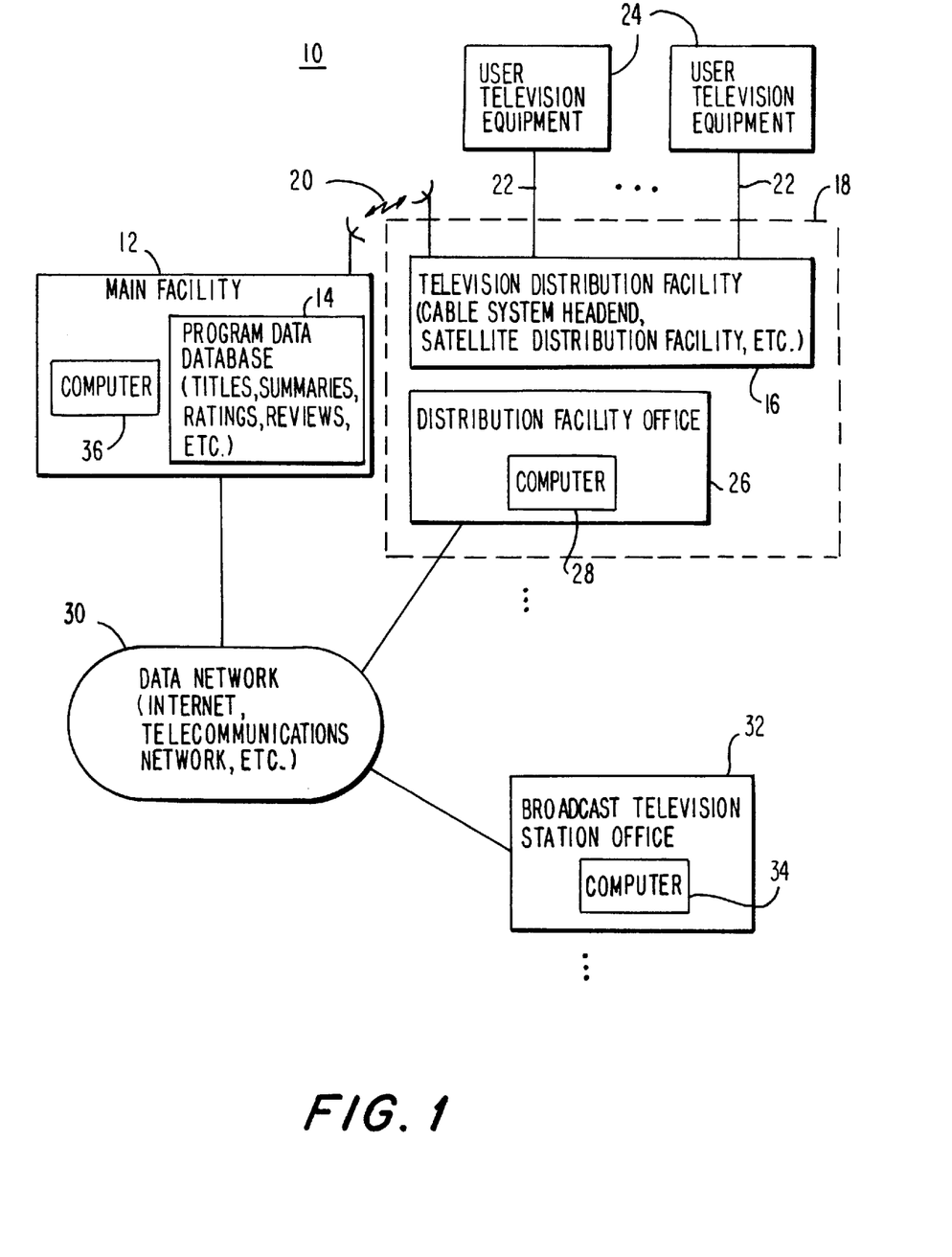
FIG. 1 is a schematic block diagram of an illustrative system in accordance with the present invention.

An illustrative system 10 in accordance with the present invention is shown in FIG. 1. Main facility 12, which is typically operated by a television program data provider, distributes program data from program data database 14 to television distribution facilities such as television distribution facility 16 of television system 18 for use in passive and interactive television program guides. If desired, the program data may also be used in other services. Television distribution facility 16 may be a cable system headend, a satellite television distribution facility, or a broadcast distribution facility.

Each television system 18 (i.e., cable system, satellite system, or broadcast system) distributes television programming according to a different program schedule. Accordingly, each television distribution facility 16 receives a set of television program data that is customized for use in the program guide or guides of its associated television system 18. Although there are a number of television systems 18 associated with main facility 12, only a single television system 18 is shown in its entirety in FIG. 1 to avoid over-complicating the drawings.

Program data is distributed from main facility 12 to television distribution facility 16 via communications link 20. Communications link 20 may be a satellite link, a telephone network link, a cable or fiber optic link, a microwave link, a combination of such links, or any other suitable communications path. The program data transmitted by main facility 12 to television distribution facility 16 may include television program scheduled broadcast times, channels, titles, summaries, reviews, ratings, running times, pay-per-view ordering information such as pay-per-view telephone ordering numbers, pay-per-view prices, and any other suitable information related to television programming.

A passive television program guide may be provided using character generator equipment within television distribution facility 16 to convert the customized program data for that facility 16 into a scrolling guide of program listings. The scrolling program listings are provided to the user television equipment 24 of multiple users via communications paths 22. Communications paths 22 preferably have sufficient bandwidth to allow television distribution facility 16 to distribute television programming to user television equipment 24. If desired, television programming may be provided over separate communications paths (not shown). If television distribution facility 16 is a cable system headend, communications paths 22 may be coaxial cable and fiber optic links. If television distribution facility 16 is a satellite or broadcast distribution facility, communications paths 22 may be free-space links between transmitter equipment in television distribution facility 16 and receiver equipment in user equipment 24. Communications paths 22 may be used to provide a scrolling guide of program listings to the users on a dedicated television channel. Any type of user television equipment that contains a standard television may be used to view such a passive guide.

An interactive television program guide may be provided by redistributing the customized program data provided to television distribution facility 16 from main facility 12 to the user television equipment 24 of each user via communications paths 22. Each user's television equipment 24 preferably includes a set-top box, satellite receiver, or comparable equipment that executes an interactive program guide application to provide the functions of the interactive television program guide using the program data.

Cable television systems, satellite television systems, and broadcast television systems are collectively referred to herein as television systems. Such television systems have associated television system offices, each of which has a television system office computer. For example, television system 18 has an associated distribution facility office 26. Broadcast television station office 32 is associated with a broadcast television system that is not shown separately in FIG. 1. Distribution facility office 26 has computer 28 and broadcast television station office 32 has computer 34. If desired, television system offices may be located within their associated television distribution facilities.

Personnel at distribution facility office 26 can link computer 28 to database 14 of main facility 12 via data network 30. Similarly, personnel at broadcast television station office 32 can link computer 34 to database 14 via data network 30. Data network 30 may be the Internet, a telecommunications network such as a telephone network, or any other suitable data communications network. Computers 28 and 34 and one or more computers such as computer 36 in main facility 12 execute communications applications, editing applications, data processing applications, and other suitable computer applications for implementing the program data entry, editing, collecting, and processing functions of the present invention.

Figure 2:
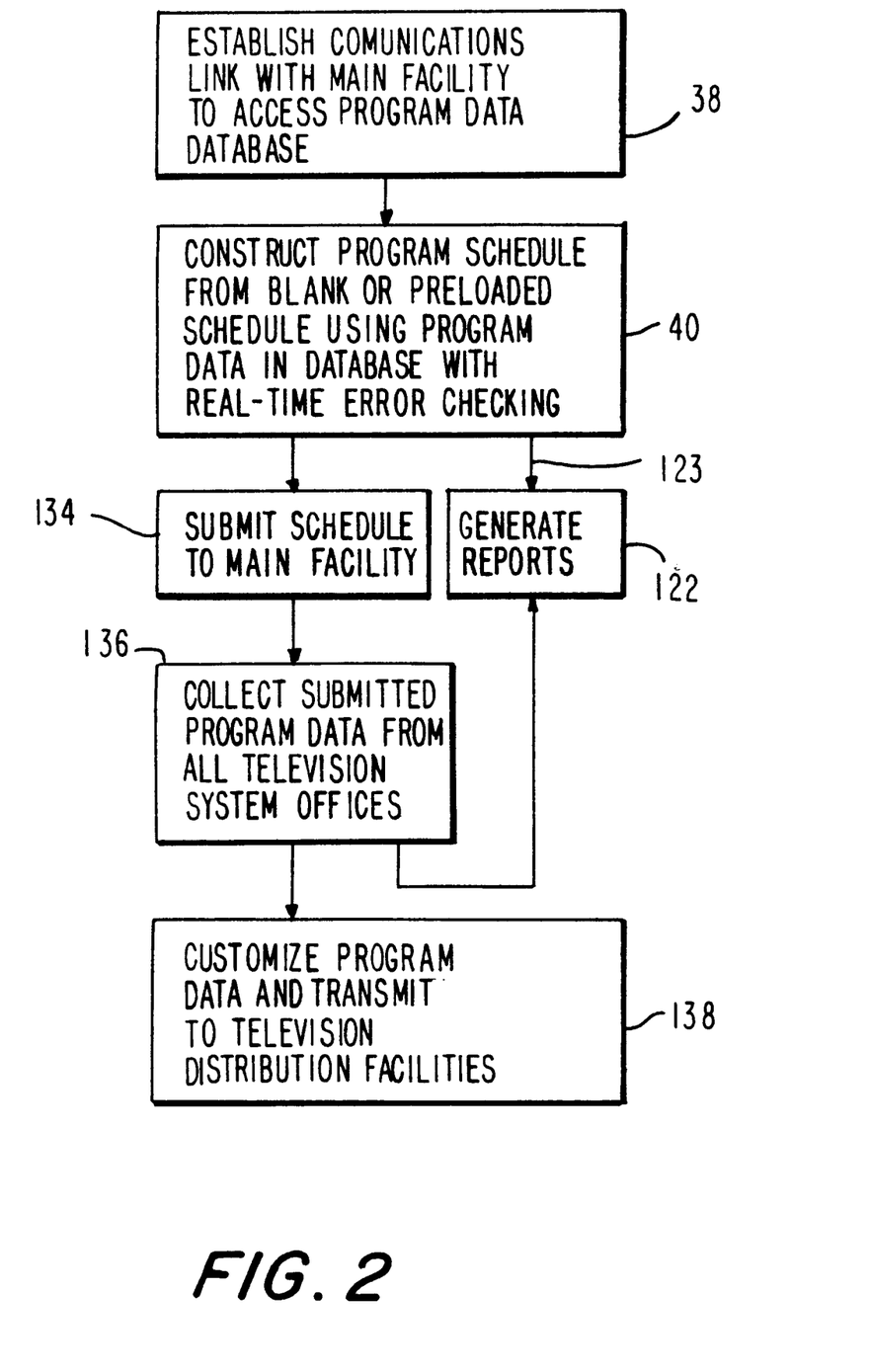
FIG. 2 is an illustrative flow chart of steps involved in the operation of the system of FIG. 1 in accordance with the present invention.

Illustrative steps involved in the operation of system 10 are shown in FIG. 2. When personnel at a television system office desire to construct a schedule of program data for submission to main facility 12 (e.g., to report that television system's schedule for the upcoming week or weeks), communications are established between a television system office computer such as computer 28 or computer 34 of FIG. 1 and a main facility computer such as computer 36 of FIG. 1 at step 38. The way in which communications are established between the television system office computer and the main facility computer depends on the type of communications applications and communications hardware used in system 10. For example, communications may be established using a pair of modems that communicate directly over a telephone network. Data network 30 may use satellite communications. If desired, data network 30 may be the Internet and the television system office computer may use a web browser to communicate with a server implemented on the main facility computer.

Regardless of the particular type of communications link that is established at step 38, the communications link allows personnel at the television system office to connect to the main facility program data database. As a result, at step 40 personnel at the television system office computer are able to construct a program schedule for submission to the data provider by accessing the database of the data provider directly, rather than by filling out forms by hand and mailing or faxing them to the data provider for transcription onto the main facility computer.

The schedule may be constructed by creating a new program schedule (e.g., in the form of a blank grid) or may be created from a preloaded schedule (e.g., in the form of a grid in which some of the grid cells are already filled with program data). The term "grid" refers to grids of all sizes including grids of single-cell width, such as may be used when the television system involved is a single-channel local television broadcast station that wishes to supply its upcoming program schedule to the data provider.

Once such a grid or other suitable initialized program schedule file has been created, schedule construction may proceed using an editing application. Suitable editing applications may run primarily on the television system office computer, primarily on the main facility computer, or may run on both the television system office computer and the main facility computer.

Figure 3:
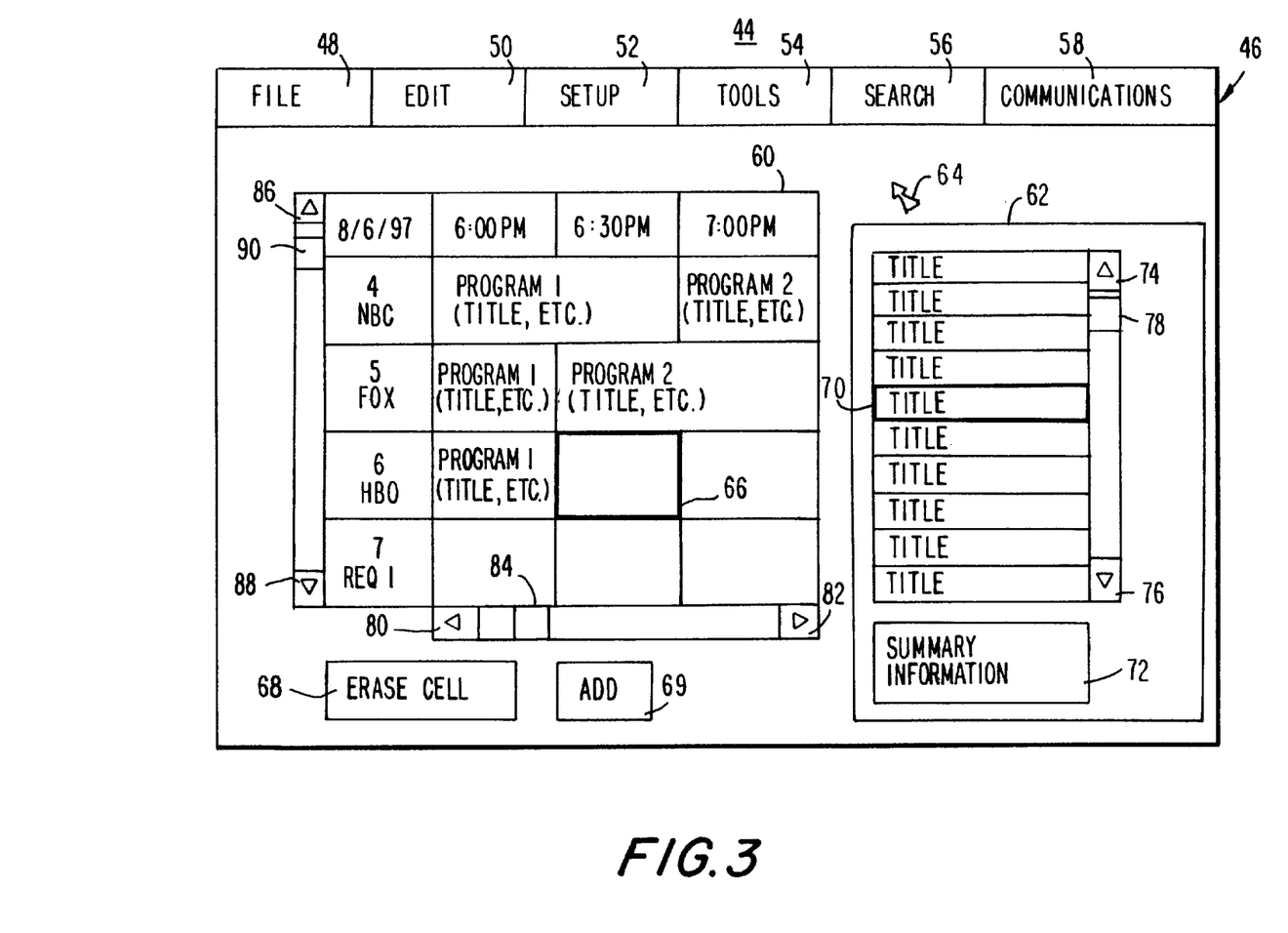
FIG. 3 is an illustrative display screen that may be used to construct a program schedule in accordance with the present invention.

A display 44 of the type that may be provided on the television system office computer during the program schedule construction of step 40 is shown in FIG. 3. The features of display 44 are illustrative only. Any other suitable computer application may be used to allow personnel to construct a schedule of program data for submission to the main facility.

Display 44 provides a number of options in the form of drop-down menu 46. File option 48 provides access to file management functions such as for retrieving, saving, naming, and printing program schedules. Edit option 50 provides access to editing functions such as cut, paste, copy, delete, undelete, program grid cell-size control, etc. Setup option 52 provides access to system configuration functions such as general preferences, display preferences, program data preloading preferences, passwords, etc. Tools option 54 provides access to functions such as pay-per-view data entry mode, report generation functions, and miscellaneous functions. Search option 56 provides access to searching functions such as theme or category searching during data entry. Communications option 58 provides access to communications functions such as communications preferences and options for submitting completed program schedules to the data provider at the main facility.

Various display modes may be used. In the display arrangement for display 44 that is shown in FIG. 3, a program schedule grid 60 is provided for entry and editing of program data. Personnel may add data to a cell in grid 60 by typing in a desired entry. In addition, personnel at the television system office computer may place data in grid 60 by selecting an entry from program list 62. Program list 62 preferably contains a list of program titles and related program information that is obtained directly from program data database 14 (FIG. 1) in the main facility. Because such program data is obtained from the program data database, program titles selected from program list 62 are essentially error-free. Moreover, personnel at the television system office computer may access program summary information, running times, ratings, reviews, and other program data in the database that would not otherwise be readily available to the television system.

The cell of grid 60 into which program data for a given program is to be placed may be selected by placing cursor 64 on top of a desired cell and clicking once (e.g., using a mouse, trackball, or other suitable pointing device). This preferably causes a highlight such as highlight 66 to appear on grid 60 surrounding the selected cell. If a selected cell contains program data, that program data may be erased by clicking on erase cell option 68.

Program data such as program titles, summary information, running times, ratings, star ratings, etc. may be added to the selected cell by placing cursor 64 on top of a desired title in program list 62 and clicking once. This preferably causes a highlight 70 to appear over the desired title (and over any other information that is contained adjacent to the title in program list 62). Clicking on add cell option 69 causes the highlighted program title and other information to be added to the program schedule grid cell under highlight 66. If desired, a program title may be added to a given cell by double clicking on the desired title in program list 62.

Display 44 preferably provides a summary information box 72 containing summary information (e.g., a movie synopsis, etc.) for the program with the highlighted title in program list 62. This reduces the possibility that errors will be introduced when two programs share the same title, because the summary information in box 72 may be reviewed by television system office personnel before the final selection of that entry from list 62 is made.

Scroll buttons 74 and 76 and positioning button 78 may be used to locate a desired title from list 62. In addition, a desired title may be typed in using the keyboard of the television system office computer. List 62 preferably allows titles to be located and automatically displayed in the center of list 62 under highlight 70 by typing in the first few letters of a desired title or by typing in the first few letters of a title and executing a search. Another feature that may be used to located a desired program entry is the search feature accessed through search option 56. Selecting "search" from the drop-down menu associated with search option 56 allows desired categories (sports, movies, comedy, etc.) and keywords to be entered to locate a desired entry in list 62. Once the desired search parameters are defined, a search of database 14 (FIG. 1) is performed to find a program entry from list 62 that matches the search parameters. Search results may be displayed in the center of program list 62. Scroll buttons 80 and 82 and positioning button 84 may be used to move among the various time slots in grid 60.

Scroll buttons 86, 88, and positioning button 90 may be used to move between different channels. A local broadcast television station may have only one channel for which program data for the schedule must be entered. A cable system or satellite system may have 100 or more channels in their channel lineup, including networks channels, local channels, premium channels, superstations, pay-per-view channels, promotional channels, etc. Several features may be used to facilitate the entry of program data for a large number of channels. For example, because the program data entries in some of the cells of program grid 60 do not change from week to week, it may be desirable to start the process of constructing a program schedule at step 40 using a copy of the program schedule for an existing grid 60. Cells that require new entries may then be updated.

Another option that may be used involves creating program schedule grids 60 with preloaded program data. Because a cable or satellite television system may not wish to make any changes to the program schedule of a broadcast network that it carries, that broadcast network's program schedule can be automatically preloaded into an otherwise blank program grid 60 when a grid is constructed at step 40. Schedules with preloaded programming data are provided using database 14 of FIG. 1. Any suitable program data may be preloaded. Configuration information concerning the channels and time periods for which such preloading is desired may be entered using setup option 52.

Figure 4:
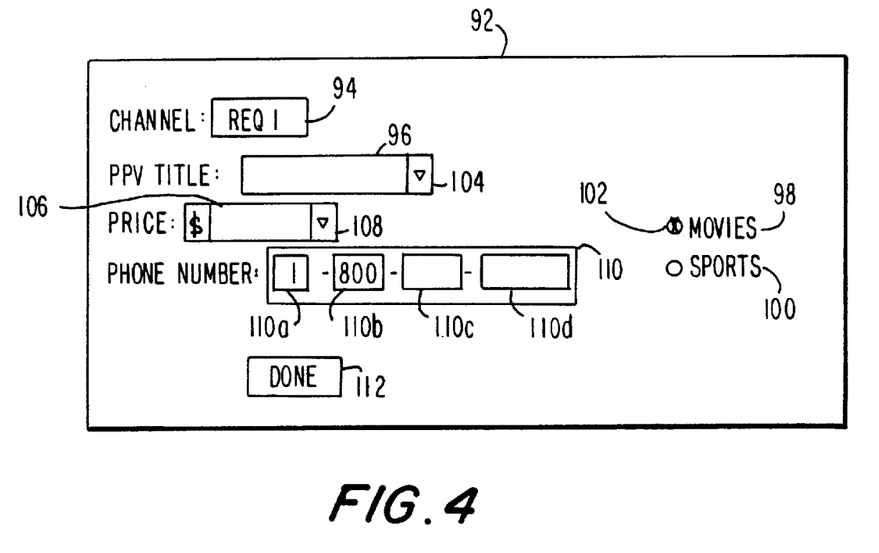
FIG. 4 is an illustrative program data entry screen for use in constructing a program schedule containing pay-per-view information in accordance with the present invention.

When pay-per-view information is entered during step 40, a display arrangement such as pay-per-view data entry display 92 of FIG. 4 may be used. The arrangement of display 92 helps personnel at the television system office computer to add pay-per-view program data to the cell of program grid 60 under highlight 66. Display 92 may be invoked by selecting the pay-per-view data entry mode under tools option 54 of FIG. 3. When display 92 is presented, channel call letters or other information that identifies the channel associated with the highlighted cell is preferably automatically displayed in channel identifier box 94. The title for the pay-per-view event may be typed into title box 96. Alternatively, the title for the pay-per-view event may be selected directly from database 14 (e.g., by typing the first few letters of a desired title and searching, by scrolling through a list of titles, etc.) and displayed in title box 96.

Titles may also be obtained from database 14 based on search parameters such as the selectable movies and sports parameters 98 and 100. In the example of FIG. 4, movies parameter 98 has been selected, as indicated by selection mark 102. To scroll through all available program titles, the user removes the selection marks from search parameters such as parameters 98 and 100 and clicks on arrow 104, whereupon a full list of the possible program entries from database 14 is displayed.

Pricing information may be entered by typing directly in price box 106 or by selecting from popular preloaded prices after clicking on arrow 108. The phone number a subscriber is to use to order the pay-per-view event is entered using phone number box 110. Boxes 110*a* and 110 are preferably preloaded to provide a visual cue that box 110 requires entry of a phone number and to save keystrokes during data entry. Boxes 110*c* and 110*d* are sized appropriately to accept a phone number. Done button 112 may be clicked on when data entry using display 92 is complete.

Figure 5:
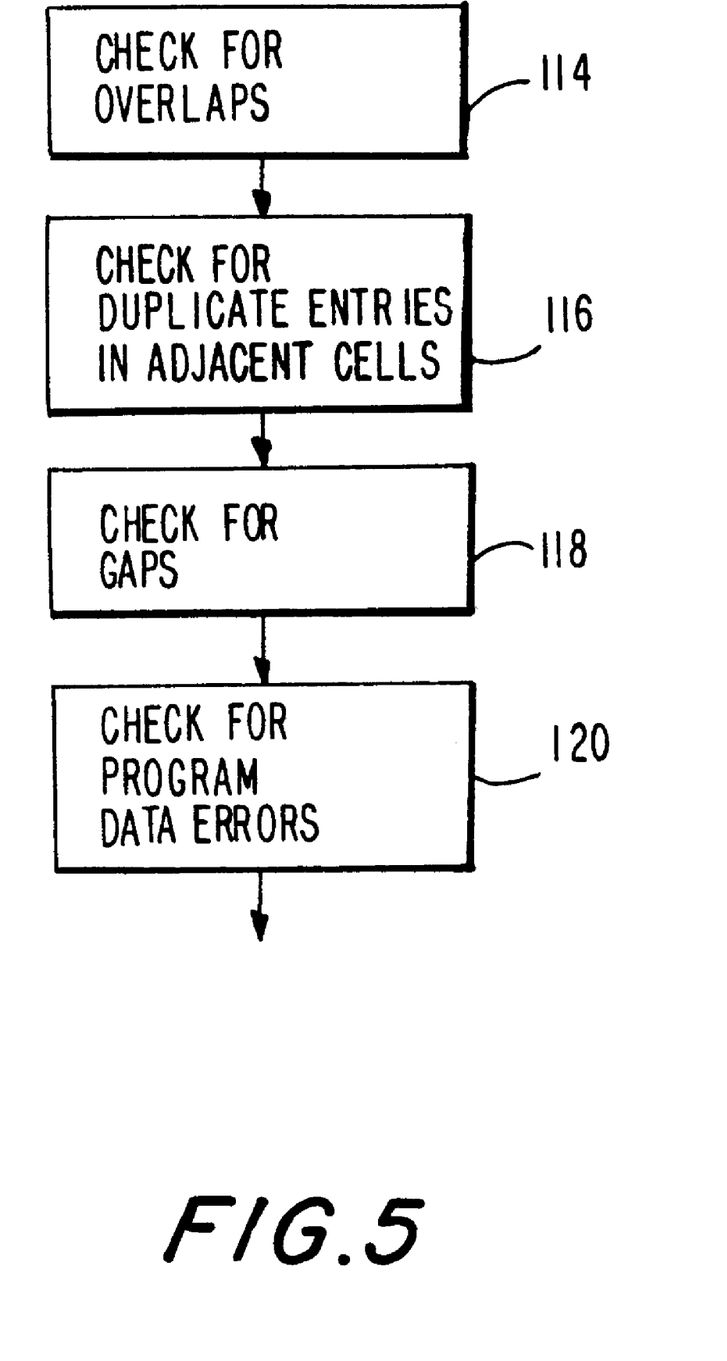
FIG. 5 is an illustrative flow chart of steps involved in real-time error checking during the process of constructing a program schedule in accordance with the present invention.

The program data entries that are made during the schedule construction of step 40 are preferably error checked in real time using an application that performs steps such as the illustrative error-checking steps shown in FIG. 5. At step 114, grid 60 is checked for entries with running times that create overlaps between adjacent cells. At step 116, grid 60 is checked for duplicate entries in adjacent cells. Although such duplicate entries are sometimes desired, the occurrence of duplicate entries is preferably flagged, so as to avoid inadvertent duplicate entries. At step 118, grid 60 is checked for gaps in programming. If desired, gaps (periods of time with no programming) of any size may be flagged. Alternatively, only gaps of substantial duration (e.g., six hours or more) may be flagged. At step 120, the program data of grid 60 is checked for errors. For example, pay-per-view pricing information may be checked to see if the price is within normal limits. Typically such pricing information is checked to determine if the price is a non-negative number and less than a predefined upper price limit. Additional error-checking steps not shown in FIG. 5 may also be performed.

Error-checking steps 114, 116, 118, and 120 may be implemented using an error-checking application that is executed concurrently with the application that supports the rest of the schedule construction process. Suitable error-checking applications may run primarily on the television system office computer, primarily on the main facility computer, or may run on both the television system office computer and the main facility computer. Although shown as separate steps, the error-checking functions of steps 114, 116, 118, and 120 are not necessarily mutually exclusive. Moreover, although shown in a certain order in FIG. 5, such error-checking steps may be performed in any desired order or may be performed concurrently.

Upon completion of the program schedule construction of step 40, the program data for a television system may be submitted to main facility 12 at step 134. Program data that was stored locally on the television system office computer during program schedule construction may be transmitted to the main facility database over data network 30 (FIG. 1). Program data that was stored on the main facility database during program schedule construction (e.g., in the form of a web page on the main facility server) may be submitted by sending commands to the main facility database indicating that schedule construction is complete.

At step 136, the main facility assembles the program data submitted in the program schedules of the various different television systems and uses this information to update database 14. For example, database 14 may be updated to reflect current schedule information contained in the program schedule for a local broadcast station that was submitted at step 134.

When sufficient program data has been collected from the television systems that submit such data to generate complete sets of program data for all of the channels in a television system's lineup for an appropriate time period (e.g., for the next week), main facility 12 forms a suitable customized set of next week's program data for that television system and transmits this program data to the appropriate television distribution facility 18 at step 138. The television distribution facility 18 may use the program data from the main facility to provide a passive television program guide or may retransmit the program data to user equipment 24 for use in an interactive television program guide.

Another aspect of the invention involves the generation of reports that can be used by marketing and sales personnel. Personnel at a television system must typically sell advertising time, make promotions, and perform other sales and marketing tasks based on the program schedule for that television system. The program schedule for a given television system office to use in generating ad trafficking reports may be based on program schedule data stored locally by the television system office computer during schedule construction. The program schedule for a given television system office to use in generating ad trafficking reports may also be based on program schedule data stored in the main facility database (e.g., after the data has been collected from the various television systems submitting such data). If the program schedule data used to generate an ad trafficking report is stored locally, the ad trafficking report may be generated at step 122 as soon as the locally-stored data is finalized (see path 123 of FIG. 2). If the program schedule data used to generate an ad trafficking report is obtained from the main facility database, the ad trafficking report may be generated at step 122 by accessing such data in the main facility after the data has been collected from each television system data source (see path 125).

Figure 6:
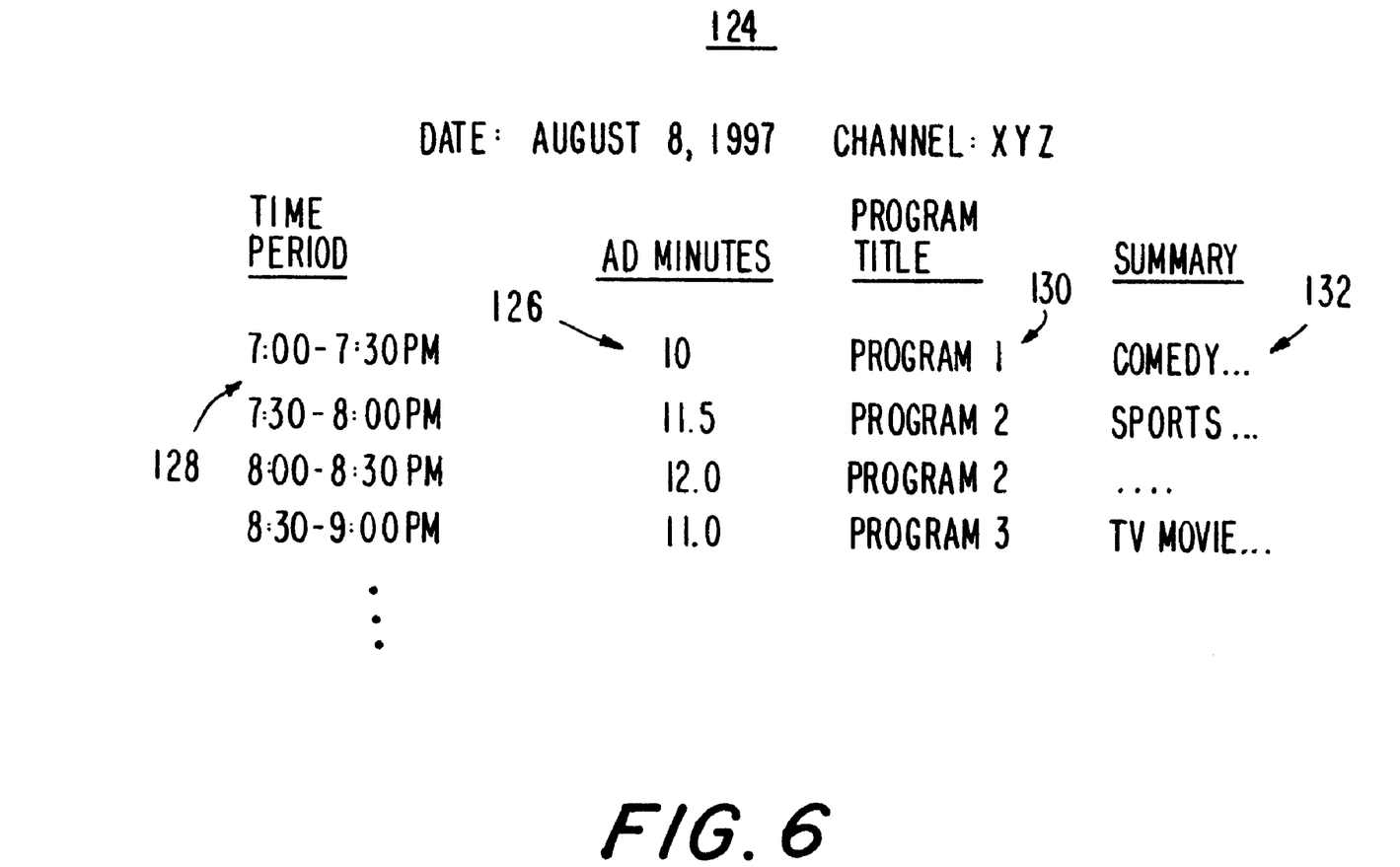
FIG. 6 is an illustrative ad trafficking report generated by the system of the present invention.

An illustrative ad trafficking report 124 generated based on the program schedule of a given television station is shown in FIG. 6. An ad trafficking report typically includes information concerning the amount of advertizing time that the personnel at the television station have available to sell for each given time period. For example, in ad trafficking report 124, the number of available advertizing minutes 126 is shown for each time period 128 and associated title 130. The amount of time available for sale may depend on a variety of factors, such as the nominal running time of the scheduled program, the amount of national advertizing or local advertizing that is already committed for that slot, the amount of public service announcement or station identification time required for that slot, etc. Each of these factors may be used to generate an ad trafficking report in step 122 of FIG. 2. Because the program data needed to generate such a report is electronically available to the television system office computer either locally or on database 14, the television system office computer can perform the calculations involved in generating ad trafficking report 124 rapidly without human intervention.

The television system office computer may incorporate program data such as program summary information 132 into ad trafficking report 124. Summary information 132, which may include running times, ratings, category information, reviews, etc., may be obtained from database 14. Providing such summary information in ad trafficking report 124 allows television system sales or marketing personnel to use the summary information in making advertizing sales, promotions, etc.

If desired, main facility 12 may distribute program data to video or print facilities other than television distribution facilities. For example, program data may be distributed to a print facility for use in a program guide that is printed rather than electronic.

The foregoing is merely illustrative of the principles of this invention and various modifications can be made by those skilled in the art without departing from the scope and spirit of the invention.

What is claimed is:

1. A system for electronically collecting program data over a data network, comprising:
   a facility with a database of program data that is provided to multiple television distribution facilities for use in electronic program guides; and
   a plurality of television system computers at which program schedules are constructed for submission to the facility by accessing program data at the facility database over the data network.

2. The system defined in claim 1 further comprising means for constructing the program schedules from schedules that are preloaded with program data.

3. The system defined in claim 1 further comprising means for real-time error checking the program schedules as they are constructed.

4. The system defined in claim 1 wherein the program schedules contain grid cells, the system further comprising means for real-time error checking the program schedules for overlaps in adjacent grid cells.

5. The system defined in claim 1 wherein the program schedules contain grid cells, the system further comprising means for real-time error checking the program schedules for duplicate program data entries in adjacent grid cells.

6. The system defined in claim 1 wherein the program schedules contain grid cells, the system further comprising means for real-time error checking the program schedules for time gaps between program data entries in different grid cells.

7. The system defined in claim 1 wherein the data network is the Internet.

8. The system defined in claim 1 further comprising means for submitting constructed program schedules to the facility.

9. The system defined in claim 1 further comprising means for collecting program data at the facility that is submitted from a plurality of the television system computers.

10. The system defined in claim 1 wherein at least some of the television system computers are cable system office computers.

11. The system defined in claim 1 wherein at least some of the television system computers are broadcast television system office computers.

12. The system defined in claim 1 wherein at least some of the television system computers are satellite television system office computers.

13. The system defined in claim 1 wherein the facility comprises means for transmitting the program data to the television systems via satellite.

14. The system defined in claim 1 wherein at least some of the television distribution facilities are cable system headends.

15. The system defined in claim 1 wherein at least some of the television distribution facilities are satellite distribution facilities.

16. The system defined in claim 1 further comprising means for constructing program schedules using program lists that contain program titles obtained from the database that may be selected from the television system computers.

17. The system defined in claim 1 further comprising means for constructing program schedules using program lists that contain program titles obtained from the database that may be selected from the television system computers and that contain summary information associated with selected program titles.

18. The system defined in claim 1 further comprising means for generating reports based on the program schedule for a given television system.

19. The system defined in claim 1 further comprising means for generating ad trafficking reports based on the program schedule for a given television system.

20. The system defined in claim 1 further comprising means for constructing the program schedules by entering pay-per-view program data.

21. The system defined in claim 1 further comprising means for constructing the program schedules by accessing pay-per-view program data in the database.

22. The system defined in claim 1 wherein the program schedules contain grid cells, the system further comprising means for erasing the program data from a selected grid cell.

23. The system defined in claim 1 wherein the program schedules contain grid cells, the system further comprising means for adding program data to a selected grid cell.

24. A method for electronically collecting program data over a data network, comprising the steps of:
using a facility having a database of program data that is provided to multiple television distribution facilities for use in electronic program guides; and
constructing program schedules for submission to the facility at a plurality of television system computers by accessing program data at the facility database over the data network.

25. The method defined in claim 24 further comprising the step of constructing the program schedules from schedules that are preloaded with program data.

26. The method defined in claim 24 further comprising the step of error checking the program schedules in real time as they are constructed.

27. The method defined in claim 24 wherein the program schedules contain grid cells, the method further comprising the step of error checking the program schedules in real time for overlaps in adjacent grid cells.

28. The method defined in claim 24 wherein the program schedules contain grid cells, the method further comprising the step of error checking the program schedules in real time for duplicate program data entries in adjacent grid cells.

29. The method defined in claim 24 wherein the program schedules contain grid cells, the method further comprising the step of error checking the program schedules in real time for time gaps between program data entries in different grid cells.

30. The method defined in claim 24 wherein the data network is the Internet.

31. The method defined in claim 24 further comprising the step of submitting constructed program schedules to the facility.

32. The method defined in claim 24 further comprising the step of collecting program data at the facility that is submitted from a plurality of the television system computers.

33. The method defined in claim 24 wherein at least some of the television system computers are cable system office computers.

34. The method defined in claim 24 wherein at least some of the television system computers are broadcast television system office computers.

35. The method defined in claim 24 wherein at least some of the television system computers are satellite television system office computers.

36. The method defined in claim 24 further comprising the step of transmitting the program data to the television systems via satellite.

37. The method defined in claim 24 wherein at least some of the television distribution facilities are cable system headends.

38. The method defined in claim 24 wherein at least some of the television distribution facilities are satellite distribution facilities.

39. The method defined in claim 24 further comprising the step of constructing program schedules using program lists that contain program titles obtained from the database that may be selected from the television system computers.

40. The method defined in claim 24 further comprising the step of constructing program schedules using program lists that contain program titles obtained from the database that may be selected from the television system computers and that contain summary information associated with selected program titles.

41. The method defined in claim 24 further comprising the step of electronically generating reports based on the program schedule for a given television system.

42. The method defined in claim 24 further comprising the step of electronically generating ad trafficking reports based on the program schedule for a given television system.

43. The method defined in claim 24 further comprising the step of constructing the program schedules by entering pay-per-view program data.

44. The method defined in claim 24 further comprising the step of constructing the program schedules by accessing pay-per-view program data in the database.

45. The method defined in claim 24 wherein the program schedules contain grid cells, the method further comprising the step of erasing the program data from a selected grid cell.

46. The method defined in claim 24 wherein the program schedules contain grid cells, the method further comprising the step of adding program data to a selected grid cell.

47. A system for electronically collecting program data over a data network, comprising:
a database of program data that is provided to at least one facility for use in a program guide; and
a plurality of television system computers at which program schedules are constructed for submission to the database by accessing program data in the database over the data network.

48. A method for electronically collecting program data over a data network, comprising the steps of:
using a database of program data that is provided to at least one facility for use in a program guide; and
constructing program schedules for submission to the database at a plurality of television system computers by accessing program data in the database over the data network.

49. The system defined in claim 1, wherein the facility is a main facility.

50. The method defined in claim 24, wherein the facility is a main facility.

51. The system defined in claim 47 further comprising means for constructing the program schedules from schedules that are preloaded with program data.

52. The system defined in claim 47 further comprising means for real-time error checking the program schedules as they are constructed.

53. The system defined in claim 47 wherein the program schedules contain grid cells, the system further comprising means for real-time error checking the program schedules for overlaps in adjacent grid cells.

54. The system defined in claim 47 wherein the program schedules contain grid cells, the system further comprising means for real-time error checking the program schedules for duplicate program data entries in adjacent grid cells.

55. The system defined in claim 47 wherein the program schedules contain grid cells, the system further comprising means for real-time error checking the program schedules for time gaps between program data entries in different grid cells.

56. The system defined in claim 47 wherein the data network is the Internet.

57. The system defined in claim 47 further comprising means for submitting constructed program schedules to the database.

58. The system defined in claim 47 further comprising means for collecting program data at the database that is submitted from a plurality of the television system computers.

59. The system defined in claim 47 wherein at least some of the television system computers are cable system office computers.

60. The system defined in claim 47 wherein at least some of the television system computers are broadcast television system office computers.

61. The system defined in claim 47 wherein at least some of the television system computers are satellite television system office computers.

62. The system defined in claim 47 further comprising means for transmitting the program data to the television systems via satellite from the database.

63. The system defined in claim 47 wherein at least one of the facilities is a television distribution facility.

64. The system defined in claim 47 further comprising means for constructing program schedules using program lists that contain program titles obtained from the database that may be selected from the television system computers.

65. The system defined in claim 47 further comprising means for constructing program schedules using program lists that contain program titles obtained from the database that may be selected from the television system computers and that contain summary information associated with selected program titles.

66. The system defined in claim 47 further comprising means for generating reports based on the program schedule for a given television system.

67. The system defined in claim 47 further comprising means for generating ad trafficking reports based on the program schedule for a given television system.

68. The system defined in claim 47 further comprising means for constructing the program schedules by entering pay-per-view program data.

69. The system defined in claim 47 further comprising means for constructing the program schedules by accessing pay-per-view program data in the database.

70. The system defined in claim 47 wherein the program schedules contain grid cells, the system further comprising means for erasing the program data from a selected grid cell.

71. The system defined in claim 47 wherein the program schedules contain grid cells, the system further comprising means for adding program data to a selected grid cell.

72. The system defined in claim 47, further comprising a main facility, wherein the database is located in the main facility.

73. The method defined in claim 48 further comprising the step of constructing the program schedules from schedules that are preloaded with program data.

74. The method defined in claim 48 further comprising the step of error checking the program schedules in real time as they are constructed.

75. The method defined in claim 48 wherein the program schedules contain grid cells, the method further comprising the step of error checking the program schedules in real time for overlaps in adjacent grid cells.

76. The method defined in claim 48 wherein the program schedules contain grid cells, the method further comprising the step of error checking the program schedules in real time for duplicate program data entries in adjacent grid cells.

77. The method defined in claim 48 wherein the program schedules contain grid cells, the method further comprising the step of error checking the program schedules in real time for time gaps between program data entries in different grid cells.

78. The method defined in claim 48 wherein the data network is the Internet.

79. The method defined in claim 48 further comprising the step of submitting constructed program schedules to the database.

80. The method defined in claim 48 further comprising the step of collecting program data at the database that is submitted from a plurality of the television system computers.

81. The method defined in claim 48 wherein at least some of the television system computers are cable system office computers.

82. The method defined in claim 48 wherein at least some of the television system computers are broadcast television system office computers.

83. The method defined in claim 48 wherein at least some of the television system computers are satellite television system office computers.

84. The method defined in claim 48 further comprising the step of transmitting the program data to the television systems via satellite.

85. The method defined in claim 48 wherein at least one of the facilities is a television distribution facility.

86. The method defined in claim 48 further comprising the step of constructing program schedules using program lists that contain program titles obtained from the database that may be selected from the television system computers.

87. The method defined in claim 48 further comprising the step of constructing program schedules using program lists that contain program titles obtained from the database that may be selected from the television system computers and that contain summary information associated with selected program titles.

88. The method defined in claim 48 further comprising the step of electronically generating reports based on the program schedule for a given television system.

89. The method defined in claim 48 further comprising the step of electronically generating ad trafficking reports based on the program schedule for a given television system.

90. The method defined in claim 48 further comprising the step of constructing the program schedules by entering pay-per-view program data.

91. The method defined in claim 48 further comprising the step of constructing the program schedules by accessing pay-per-view program data in the database.

92. The method defined in claim 48 wherein the program schedules contain grid cells, the method further comprising the step of erasing the program data from a selected grid cell.

93. The method defined in claim 48 wherein the program schedules contain grid cells, the method further comprising the step of adding program data to a selected grid cell.

94. The method defined in claim 48 wherein the database is located at a main facility.

* * * * *

UNITED STATES PATENT AND TRADEMARK OFFICE
CERTIFICATE OF CORRECTION

PATENT NO. : 6,209,130 B1
DATED : March 27, 2001
INVENTOR(S) : Earl M. Rector, Jr. et al.

It is certified that error appears in the above-identified patent and that said Letters Patent is hereby corrected as shown below:

<u>Drawings,</u>
FIG. 2, first box: change "COMUNICATIONS" to -- COMMUNICATIONS --.

Signed and Sealed this

Seventeenth Day of September, 2002

Attest:

Attesting Officer

JAMES E. ROGAN
*Director of the United States Patent and Trademark Office*